(12) United States Patent
Rigakos

(10) Patent No.: US 6,966,094 B1
(45) Date of Patent: Nov. 22, 2005

(54) GRILL CLEANING BRUSH AND SCRAPER

(76) Inventor: Fotios G. Rigakos, 180 Milverton Boulevard, Toronto, ON (CA) M4J 1V4

( * ) Notice: Subject to any disclaimer, the term of this patent is extended or adjusted under 35 U.S.C. 154(b) by 202 days.

(21) Appl. No.: 10/692,631

(22) Filed: Oct. 24, 2003

(51) Int. Cl.[7] .................................. A47L 13/12
(52) U.S. Cl. .................. 15/111; 15/236.01; 15/DIG. 5
(58) Field of Search .................... 15/111, 236.01, 15/DIG. 5

(56) References Cited

U.S. PATENT DOCUMENTS

| | | | | |
|---|---|---|---|---|
| 2,306,051 A | * | 12/1942 | Ghelber | 15/176.5 |
| 4,091,579 A | * | 5/1978 | Giangiulio | 451/461 |
| 4,286,349 A | * | 9/1981 | Dugrenier | 15/111 |
| D429,889 S | * | 8/2000 | Fielding | D4/118 |
| 6,216,306 B1 | * | 4/2001 | Esterson et al. | 15/111 |
| 2005/0011029 A1 | * | 1/2005 | Yu | 15/111 |

* cited by examiner

Primary Examiner—Randall Chin

(57) ABSTRACT

The present invention relates to a grill cleaning tool that is comprised of a handle portion and a cleaning head portion with a removable brush head and scraper blade. The handle has a rubber grip and a hanger eye for storage when the tool is not in use. The cleaning head portion is wedge shaped to keep the cleaning head up and away from the flame. A brush head is attached vertically to the bottom of the cleaning head by a series of split snaps. Attaching the brush head vertically allows for added strength during the forward and backward motion during cleaning. A scraper blade is attached horizontally to the front of the cleaning head. Both the brush head and the scraper blade could be manufactured in a variety of sizes to accommodate any type of grill.

19 Claims, 2 Drawing Sheets

GRILL CLEANING BRUSH AND SCRAPER

BACKGROUND OF THE INVENTION

1. Field of the Invention

The present invention relates to a grill cleaning brush and scraper for use in connection with cleaning grills. The grill cleaning brush and scraper has particular utility in connection with having a grill cleaning tool with replaceable heads to clean grills.

2. Description of the Prior Art

Grill cleaning brushes and scrapers are desirable for cleaning grills. The present invention features interchangeable and replaceable cleaning heads, which enables just the cleaning head to be removed and replaced instead of having to replace the entire tool.

The use of grill cleaning tools is known in the prior art. For example, U.S. Pat. No. 6,216,306 B1 to Esterson et al discloses a grill cleaning brush and scraper having a replaceable cleaning head with scraper. However, the Esterson et al '306 patent does not have a wedge shaped cleaning head to keep the tool up and away from the flame, and has further drawbacks of not having angled bristles in the brush head that go from shorter to longer to prevent curling and bending, with the shorter bristles at the front being thicker for added durability.

U.S. Pat. No. 4,286,349 to Dugrenier discloses a broiler grill cleaning brush that consists primarily of a block with multiple bristle clusters and a removable handle. However, the Dugrenier '349 patent does not have a replaceable brush and scraper with a wedge shaped head that snaps onto the handle vertically for added strength, and additionally does not have a rubber grip handle or bristles that go from shorter to longer to prevent curling and bending.

Similarly, U.S. Pat. No. Des. 429,889 to Fielding discloses a barbecue brush that cleans grills. However, the Fielding '889 patent does not have a rubber grip contoured handle, and additionally does not have a removable brush head and scraper with a wedge shaped head.

Lastly, U.S. Pat. No. 4,091,579 to Giangiulio discloses a scraper that is used to clean grills. However, the Giangiulio '579 patent does not have a rubber grip contoured handle, and has the additional deficiency of not having a wedge shaped removable brush head and scraper.

While the above-described devices fulfill their respective, particular objectives and requirements, the aforementioned patents do not describe a grill cleaning brush and scraper that has replaceable cleaning heads. The above patents do not describe a grill cleaning tool with a replaceable wedge shaped brush and scraper head with a rubber grip handle. In the present patent, the front scraper can be shaped to the contour of any grill. The brush head snaps in vertically to provide added strength to the grill cleaning brush and scraper during the forward and backward motion of use. The bristles of the brush are arranged from shorter to longer from front to back to prevent bending and curling. The stronger thicker bristles are placed at the front of the brush head for durability.

Therefore, a need exists for a new and improved grill cleaning brush and scraper that has replaceable cleaning heads. In this regard, the present invention substantially fulfills this need. In this respect, the grill cleaning brush and scraper according to the present invention substantially departs from the conventional concepts and designs of the prior art, and in doing so provides an apparatus primarily developed for the purpose of having a grill cleaning tool with replaceable heads to clean grills.

SUMMARY OF THE INVENTION

In view of the foregoing disadvantages inherent in the known types of grill cleaning tools now present in the prior art, the present invention provides an improved grill cleaning brush and scraper, and overcomes the above-mentioned disadvantages and drawbacks of the prior art. As such, the general purpose of the present invention, which will be described subsequently in greater detail, is to provide a new and improved grill cleaning brush and scraper which has all the advantages of the prior art mentioned heretofore and many novel features that result in a grill cleaning brush and scraper which is not anticipated, rendered obvious, suggested, or even implied by the prior art, either alone or in any combination thereof.

To attain this, the present invention essentially comprises a grill cleaning tool that is essentially comprised of a handle portion and a cleaning head portion with a removable brush head and a removable scraper blade. The handle portion has a contoured rubber grip to provide the user with a better grip during use. The handle portion also has a hangar eye at the distal end for hanging the grill cleaning brush and scraper when not in use. The cleaning head portion is wedge shaped to keep the tool away from flame. The back end of the cleaning head portion is attached to the proximal end of the handle portion. The brush head is snapped vertically into place on the bottom surface of the cleaning head portion to provide added strength during use. The brush head has a series of durable bristles that are tapered from short to long to prevent curling and bending. The shorter bristles at the front of the brush head are stronger and thicker for added durability. The present invention also has an interchangeable scraper blade that is horizontally attached to the front end of the cleaning head. The scraper blade and brush head could be produced in varied sizes and shapes to accommodate any type of grill.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved grill cleaning brush and scraper that has all of the advantages of the prior art grill cleaning tools and none of the disadvantages.

It is another object of the present invention to provide a new and improved grill cleaning brush and scraper that may be easily and efficiently manufactured and marketed.

An even further object of the present invention is to provide a new and improved grill cleaning brush and scraper that has a low cost of manufacture with regard to both materials and labor, and which accordingly is then susceptible of low prices of sale to the consuming public, thereby making such grill cleaning brush and scraper economically available to the buying public.

Still another object of the present invention is to provide a new grill cleaning brush and scraper that provides in the apparatuses and methods of the prior art some of the advantages thereof, while simultaneously overcoming some of the disadvantages normally associated therewith.

Even still another object of the present invention is to provide a grill cleaning brush and scraper with replaceable and interchangeable cleaning heads. This allows just the brush head and scraper blade to be replaced instead of the entire tool thus cutting down on overall cost. The brush head and scraper blade could be offered in a variety of sizes and shapes to accommodate any type of commercial grill. The wedge shaped cleaning head helps to keep the tool up and away from the flame. The hangar eye at the end of the handle allows the tool to be hung on the grill when not in use. All in all, this invention would save the purchaser a considerable amount of money by eliminating the need to purchase a new grill cleaner when the old one is damaged or broken. The purchaser need only buy either a new scraper blade or a new brush head. Having both the scraper blade and brush head attached in one cleaning head portion also eliminates the need for purchasing separate cleaning tools.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
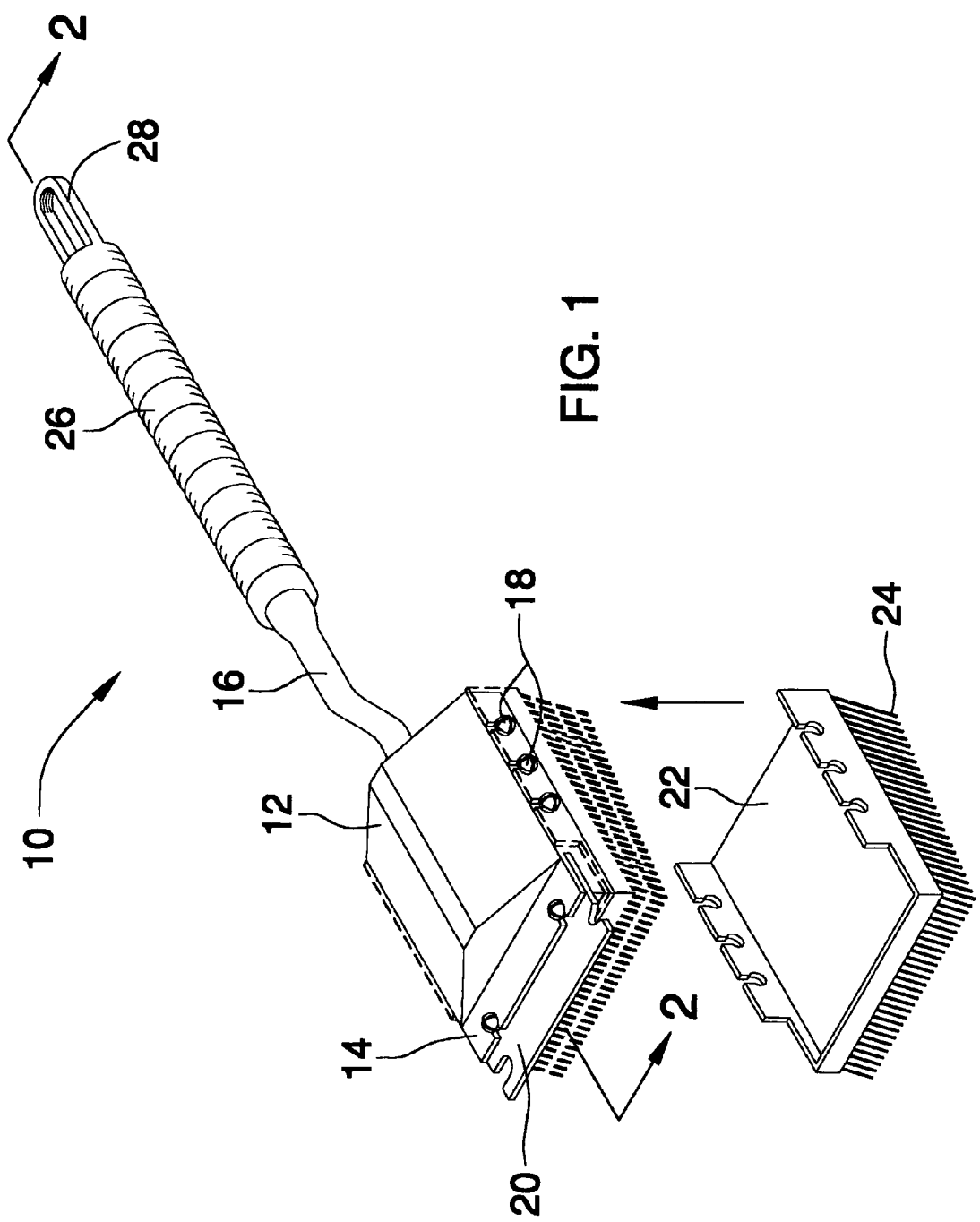
FIG. 1 is a right perspective view of the preferred embodiment of the grill cleaning brush and scraper constructed in accordance with the principles of the present invention with an exploded view of the replaceable brush head.
Figure 2:
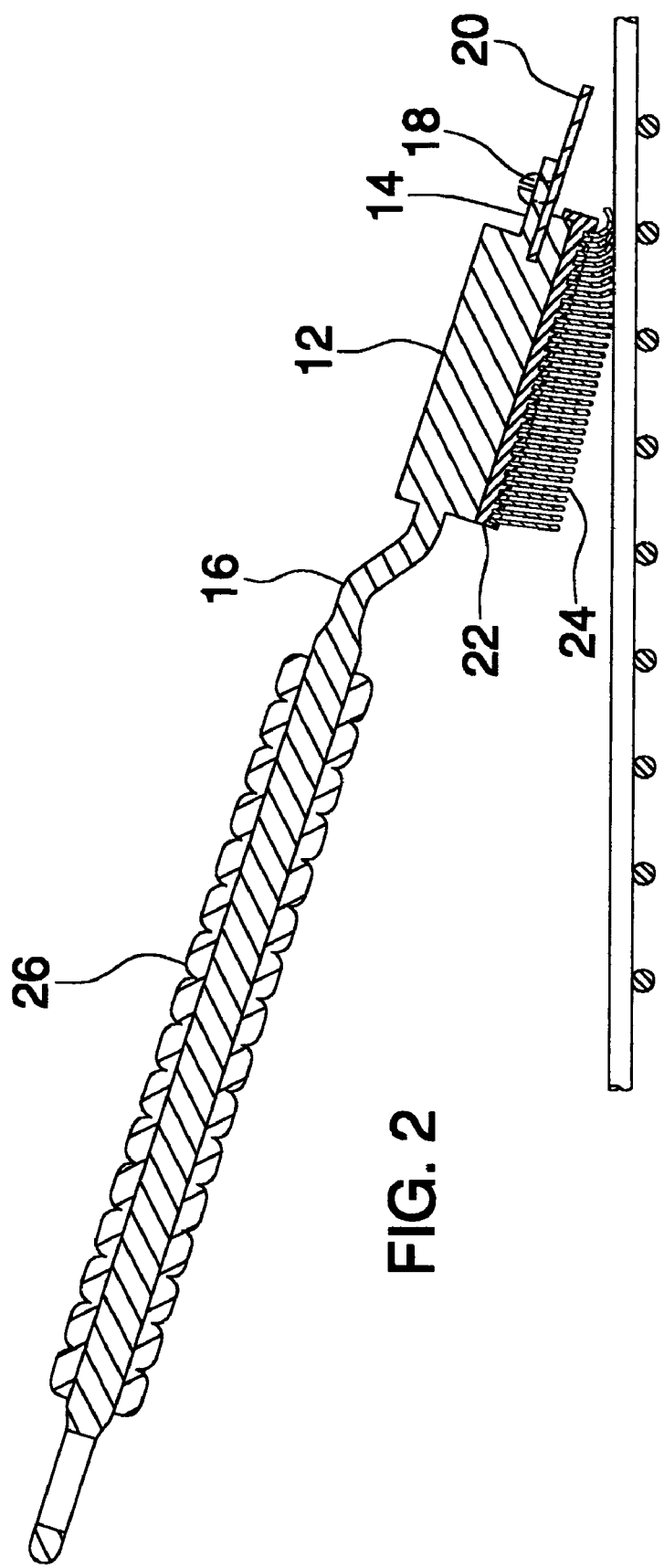
FIG. 2 is a cross-sectional view of the grill cleaning brush and scraper taken substantially along the 2—2 line of FIG. 1 of the present invention.

Referring now to the drawings, and particularly to FIGS. 1–2, a preferred embodiment of the grill cleaning brush and scraper of the present invention is shown and generally designated by the reference numeral 10.

In FIG. 1, a new and improved grill cleaning brush and scraper 10 of the present invention for cleaning grills is illustrated and will be described. More particularly, the grill cleaning brush and scraper 10 is comprised of a handle portion 16 and a cleaning head portion 12. The handle 16 may be made of any relatively strong and thermally insulating material such as wood or heavyweight plastic. The handle 16 has a proximal end and a distal end. The distal end of the handle 16 is modified to accept a hangar eye 28, such as a flat metal or plastic piece having a suitably dimensioned opening from which the grill cleaning brush and scraper 10 may hang. In the alternative, the distal end of the handle 16 may itself form a hangar eye 28. The proximal end of the handle 16 attaches to the back section of the cleaning head 12. The handle 16 has a slight upward step curvature at its proximal end which flattens out into the handle grip 26. The handle grip section 26 can be formed of a single material or have a core of suitable hard material with a coated surface or overmold grip made from a deformable material such as rubber or plastic.

The cleaning head 12 is comprised of a front section, a back section, a top section, a bottom section, and opposing side sections. A scraper blade 20 is attached to the front section of the cleaning head 12 by a pair of split snaps 24. The back section of the cleaning head 12 is attached to the proximal end of the handle 16. The top section of the cleaning head 12 is wedge shaped so as to keep the cleaning head 12 up and away from the flame when in use. A replaceable brush head 22 is attached to the bottom section of the cleaning head 12 through the use of a plurality of split snaps 18 located on each of the opposing side sections of the cleaning head 12. The brush head 22 is comprised of a base section, a raised front section, and opposing raised side sections. The base section of the brush head 22 has opposing top and bottom surfaces. Each of the opposing side sections of the brush head 22 extend upwardly from the top surface of the base section and contain a plurality of notches which correspond with the plurality of split snaps 18 located on the side sections of the cleaning head 12. These notches are keyhole shaped and engage with the split snaps 18 on the cleaning head 12 to vertically attach the brush head 22 to the cleaning head 12. Vertical attachment of the brush head 22 to the cleaning head 12 provides added strength during the backward and forward motion of the grill brush and scraper during use. The brush head 22 is angled with respect to the longitudinal axis of the handle 16 so as to form an angle of between about 100 degrees and about 160 degrees. A plurality of bristles 24 are affixed to the brush head 22 so as to project from the bottom surface of the base section. The bristles 24 are attached to the brush head 22 by any method known in the art so as to securely attach bristles 24 thereto. The bristles 24 are affixed in tufts in a plurality of rows. The brush bristles 24 are of variable length with shorter thicker bristles 24 being at the front of the brush head 22 and the bristles 24 increasing progressively in length towards the back of the brush head 22. This progression of bristles 24 helps to prevent curling and bending of the bristles 24 during use. The bristles 24 should be made of a strong, heat-stable, oxidation-resistant, stiff metal such as stainless steel. Though the bristles 24 are stiff, they are also flexible. The brush bristles 24 can range in length from about one quarter of an inch in length to about one half an inch in length.

In FIG. 2, a cross section of the grill cleaning brush and scraper 10 is shown. The front section of the cleaning head 12 has a flange 14 extending outwardly therefrom. A slit traverses substantially the entire front end and adjacent to and above the framework holding the bristles 24 and below the flange 14 so as to releaseably and stably engage the scraper blade 20. A scraper blade 20 is inserted into this slit and extends outwardly therefrom. The scraper blade 20 has a series of indentations on opposite sides, which contact with the sides of the slit thereby permitting the scraper blade 20 to be retained within the cleaning head 12. The scraper blade 20 has a pair of keyhole shaped notches at its proximal end. These notches correspond to a pair of split snaps 18 located on the flange 14. When these notches are engaged with the split snaps 18, the scraper blade 20 is locked into place. The scraper blade 20 can be formed of a single piece of steel or other metal. Stainless steel is favored for its long lasting durability and strength. The scraper blade 20 could be made in a variety of shapes and sizes to fit any type of grill. The entire grill cleaning brush and scraper 10 would ideally be about seventeen inches long and could be produced in a variety of sizes, styles, shapes, and colors.

While a preferred embodiment of the grill cleaning brush and scraper has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grill cleaning brush and scraper comprising:
    a cleaning head portion having a wedge shaped top section, a bottom section, a front section, a flat back section, and opposing flat side sections, wherein said front section defines a slit therein and wherein said front section has a flange protruding outwardly above said slit;
    a handle comprised of an elongate shaft having proximal and distal ends and having a predetermined curvature, wherein said proximal end of said handle is attached to said back section of said cleaning head;
    a plurality of split snaps located on said side sections of said cleaning head and on said flange of said front section of said cleaning head to attach a scraper blade and a brush head to said cleaning head;
    a releaseably engageable scraper blade which slides into said slit of said front section of said cleaning head, wherein the back edge of said scraper blade defines a plurality of notches which correspond to said plurality of split snaps on said flange of said front section of said cleaning head;
    a releasably engageable brush head attached to said bottom section of said cleaning head, wherein said brush head has side walls extending upwards from a bottom surface, wherein said side walls define a plurality of notches which correspond to said plurality of split snaps located on each of said side sections of said cleaning head;
    a plurality of brush bristles wherein said bristles are affixed to said brush head so as to project downwardly from said bottom surface thereof.

2. The apparatus of claim 1, wherein said handle is encircled by a rubber grip overmold.

3. The apparatus of claim 1, wherein said distal end of said handle includes a hangar eye with an opening therethrough.

4. The apparatus of claim 1, wherein said scraper blade snaps onto said front section of said wedge shaped cleaning head horizontally.

5. The apparatus of claim 1, wherein said scraper blade is made from stainless steel.

6. The apparatus of claim 1, wherein said brush head snaps vertically onto said bottom section of said cleaning head.

7. The apparatus of claim 1, wherein said brush head forms a slant angle with respect to the longitudinal axis of said handle.

8. The apparatus of claim 7, wherein said slant angle is between 100 degrees and 160 degrees.

9. The apparatus of claim 1, wherein said brush bristles are arranged in a plurality of tufts.

10. The apparatus of claim 9, wherein said tufts are arranged in a plurality of rows.

11. The apparatus of claim 1, wherein said brush bristles are shorter in the front of said brush head and get progressively longer towards the back of the brush head.

12. The apparatus of claim 1, wherein said brush bristles are made of stainless steel.

13. A grill cleaning brush and scraper comprising:
    a cleaning head portion having a wedge shaped top section, a bottom section, a front section, a flat back section, and opposing flat side sections, wherein said front section defines a slit therein and wherein said front section has a flange protruding outwardly above said slit;
    a handle comprised of an elongate shaft having proximal and distal ends and having a predetermined curvature, wherein said proximal end of said handle is attached to said back section of said cleaning head;
    a plurality of split snaps located on said side sections of said cleaning head and on said flange of said front section of said cleaning head to attach a scraper blade and a brush head to said cleaning head;
    a releaseably engageable stainless steel scraper blade which horizontally slides into said slit in said front section of said cleaning head, wherein the back edge of said scraper blade defines a plurality of notches therein which correspond to said plurality of split snaps on said front section of said cleaning head;
    a releasably engageable brush head attached vertically to said bottom section of said cleaning head, wherein said brush head has side walls extending upwards from a bottom surface, wherein said side walls define a plurality of notches therein which correspond to a plurality of split snaps located on each of said side sections of said cleaning head;
    a plurality of stainless steel brush bristles arranged in a plurality of tufts wherein said tufts are arranged in a plurality of rows and wherein said bristles are affixed to said brush head so as to project downwardly from said bottom surface thereof.

14. The apparatus of claim 13, wherein said handle is encircled by a rubber grip overmold.

15. The apparatus of claim 13, wherein said distal end of said handle includes a hangar eye with an opening therethrough.

16. The apparatus of claim 13, wherein said brush head forms a slant angle with respect to the longitudinal axis of said handle.

17. The apparatus of claim 16, wherein said slant angle is between 100 degrees and 160 degrees.

18. The apparatus of claim 13, wherein said brush bristles are shorter in the front of said brush head and get progressively longer towards the back of the brush head.

19. A grill cleaning brush and scraper comprising:
- a cleaning head portion having a wedge shaped top section, a bottom section, a front section, a flat back section, and opposing flat side sections, wherein said front section defines a slit therein and wherein said front section has a flange protruding outwardly above said slit;
- a handle comprised of an elongate shaft having proximal and distal ends and having a predetermined curvature, wherein said proximal end of said handle is attached to said back section of said cleaning head and wherein said distal end includes a hangar eye with an opening therethrough;
- a rubber grip overmold wherein said overmold encircles said handle;
- a plurality of split snaps located on said side sections of said cleaning head and on said flange of said front section of said cleaning head to attach a scraper blade and a brush head to said cleaning head;
- a releaseably engageable stainless steel scraper blade which horizontally slides into said slit in said front section of said cleaning head, wherein the back edge of said scraper blade defines a plurality of notches therein which correspond to said plurality of split snaps on said front section of said cleaning head;
- a releasably engageable brush head attached vertically to said bottom section of said cleaning head and formed of a slant angle of between 100 and 160 degrees, and wherein said brush head has side walls extending upwards from a bottom surface, wherein said side walls define a plurality of notches therein which correspond to a plurality of split snaps located on each of said side sections of said cleaning head;
- a plurality of stainless steel brush bristles arranged in a plurality of tufts, wherein said tufts are arranged in a plurality of rows, and wherein said bristles are affixed to said brush head so as to project downwardly from said bottom surface thereof and wherein said brush bristles are shorter in the front of said brush head and get progressively longer towards the back of said brush head.

\* \* \* \* \*